United States Patent [19]

Corey et al.

[11] Patent Number: 4,932,441
[45] Date of Patent: Jun. 12, 1990

[54] NOZZLE DAM SEAL ASSEMBLY FOR NUCLEAR STEAM GENERATOR OR THE LIKE

[75] Inventors: Albert J. Corey, Wappingers Falls, N.Y.; Edward R. Carlson, New Fairfield, Conn.

[73] Assignee: The Presray Corporation, Pawling, N.Y.

[21] Appl. No.: 195,510

[22] Filed: May 18, 1988

[51] Int. Cl.⁵ .............................................. F16L 55/12
[52] U.S. Cl. ...................................... 138/93; 376/204
[58] Field of Search ........................... 138/93; 376/204

[56] References Cited

U.S. PATENT DOCUMENTS

| 4,582,451 | 4/1986 | Hollander, Jr. | |
| 4,637,588 | 1/1987 | Wilhelm et al. | 138/93 X |
| 4,656,714 | 4/1987 | Evans et al. | 29/428 X |
| 4,770,235 | 9/1988 | Rogers et al. | |
| 4,826,036 | 5/1989 | Lewis et al. | 138/93 X |

Primary Examiner—Gerald A. Michalsky
Attorney, Agent, or Firm—Schweitzer & Cornman

[57] ABSTRACT

A pneumatically actuated nozzle dam or the like for placement internally of a passageway, enabling the passageway to be sealed off upon inflation of a pneumatically inflatable ring. The apparatus includes an elastomeric diaphragm provided with sidewalls projecting in a downstream direction and joined with sealing flaps surrounding the sidewall and projecting back in an upstream direction. An inflatable pneumatic element is positioned between the sidewall and sealing flap and connected to only one of them. Upon inflation, the sealing flap is forced against the walls of the passageway to provide a seal. If depressurization of the inflatable element occurs, the sealing flap is retained in operative position by pressure of the retained body of liquid on the upstream side of the seal. The new arrangement eliminates the need for redundancy of the pneumatic element and, at the same time, provides for greater safety.

7 Claims, 2 Drawing Sheets

NOZZLE DAM SEAL ASSEMBLY FOR NUCLEAR STEAM GENERATOR OR THE LIKE

BACKGROUND AND SUMMARY OF THE INVENTION

In many designs of nuclear reactor installations, a steam generator is associated with the reactor. Communication between the steam generator and the reactor is through a so-called steam generator nozzle, typically connecting the steam generator at a level below the normal levels of water maintained in the reactor and its refueling pool. In such installations, it is necessary, from time to time to gain access to the interior of the steam generator to enable maintenance to be performed. For these occasions, it is necessary to reduce the water level temporarily in the reactor and refueling pool enabling a temporary dam to be installed in the generator nozzles. Once the nozzle is dammed, isolating the reactor and refueling pool from the steam generator, the reactor and refueled pool can be refilled to normal levels.

It has been known, heretofore, to employ for this purpose, a two-part frame structure, which can be disassembled, brought into the steam generator through a "man way" provided in the wall thereof. After being moved into the interior of the generator, the two-part frame structure is reassembled and fitted with an inflatable peripheral seal and integral diaphragm. The dam is then inserted into the opening of the generator nozzle and may be temporarily positioned therein by mechanical means. The peripheral inflatable seal is then inflated, pressing tightly against the sidewalls of the generator nozzle to form a seal.

It is always a concern, of course, that a leak or rapture may form in the pneumatically inflated seal, and therefore conventional nozzle dam structures frequently employ redundant seals. This naturally adds to the complication and expense of the unit.

In accordance with the present invention, a new and improved nozzle dam arrangement is provided which, while constructed generally in accordance with known principles, employs a significantly superior and improved form of pneumatically inflatable sealing arrangement, which forms a highly effective isolation seal in the generator nozzle, yet obviates the need for redundant pneumatic seals. To this end, the apparatus of the invention incorporates a continuous peripheral flap seal, which is displaceable radially by an inflatable peripheral element. When the nozzle dam is initially positioned within the generator nozzle, and the pneumatic peripheral element is pressurized, the continuous flap seal is pressed radially outward, into tight sealing engagement with the cylindrical wall of the nozzle. By orienting the free end of the continuous flap seal toward the pressurized side, the flap seal becomes self-holding as a function of the unbalanced water pressure acting thereon from the reactor and refueling pool.

While it is intended and contemplated that the peripheral inflatable element will remain pressurized at all times, should a fault develop and the element become depressurized, the flap seals of the invention device will remain operative and continue to afford an effective dam seal.

For a better understanding of the above and other features and advantages of the invention, reference should be made to the following detailed description of a preferred embodiment and to the accompany drawings.

DESCRIPTION OF A PREFERRED EMBODIMENT

Figure 1:
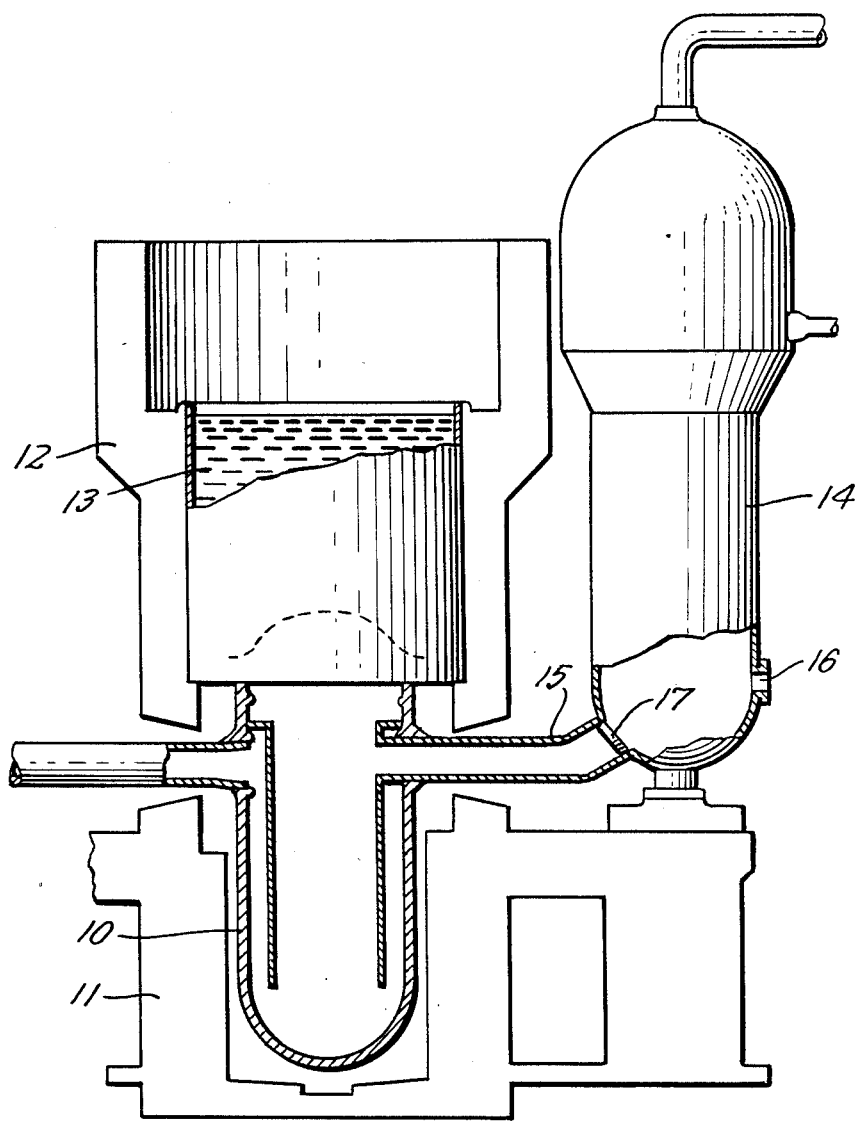
FIG. 1 is a simplified, representative, cross sectional illustration of a nuclear reactor and steam generator, illustrating a nozzle dam device installed in the generator nozzle.

Referring now to the drawing, and initially to FIG. 1 thereof, the reference numeral 10 indicates a nuclear reactor vessel housed within a containment shell 11. Directly above the reactor is a refueling pool 12, which normally contains a body of water 13 over the reactor for shielding during refueling.

Mounted alongside the reactor is a steam generator vessel 14 communicating with the reactor through a steam generator nozzle 15.

From time to time, it is necessary to gain access to the interior of the steam generator 14 for repair and maintenance purposes. To this end, the vessel is conventionally provided with a so-called man way 16, which is typically large enough for a man to crawl through, to enter the vessel, but significantly smaller than the size of the generator nozzle 15.

Before entering the vessel 14, the reactor vessel is of course deactivated and depressurized, and the water level in the reactor and refueling pool is temporarily lowered to a level below the generator nozzle 15. This allows the generator vessel 14 to be drained, in order to accommodate access to its interior.

Once inside the vessel, workmen install a dam 17 in the generator nozzle, isolating the interior of the generator vessel 14 from the reactor vessel 10 and refueling pool. As soon as this is accomplished, the water levels may be returned to normal in the reactor and pool.

Figure 2:
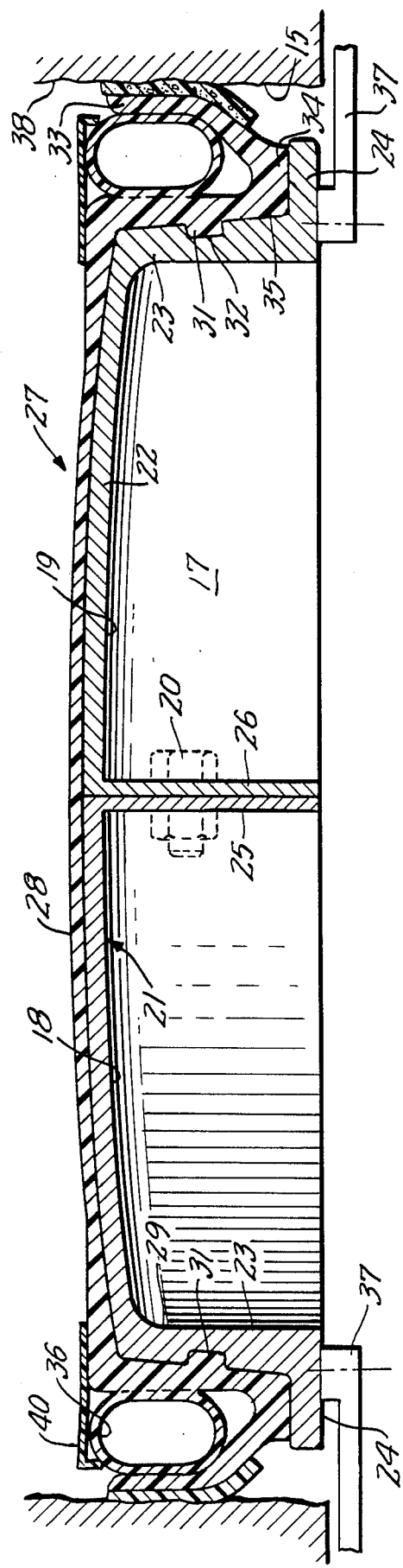
FIG. 2 is an enlarged diametral cross section of a nozzle dam structure incorporating the improved sealing arrangement of the invention, shown with the pneumatic seal in a pressurized condition.

Nozzle dams customarily used for this purpose are of multipart construction, typically three parts, so that they may be inserted through the man way 16 in disassembled condition, and then assembled and installed from the interior of the generator vessel. As reflected in FIG. 2, the nozzle dam 17 is comprised of a pair of semicircular castings 18, 19 secured together by bolts 20 through diametral partition walls 25, 26. The two castings form a circular frame structure 21.

The frame structure 21 comprises a circular transverse wall 22 which joins at its periphery with axially projecting sidewall portions 23. In the installed orientation of the nozzle dam, the sidewall portions 23 project in a "downstream" direction, that is, away from the reactor vessel 10. At the downstream edges of the sidewalls there are radially projecting flange portions 24. The outer diameter of the flange portions 24 is slightly less than the internal diameter of the generator nozzle 15, to accommodate insertion of the dam assembly into the nozzle passage in the manner shown in FIG. 2.

After assembly of the two frame halves, which is accomplished by passing bolts 20 through opposed diametral flanges 25, 26, a diaphragm assembly, generally designated by the numeral 27, is applied over the frame structure. The diaphragm assembly is formed of an elastomeric material and includes a central, circular diaphragm portion 28, which is applied over and seals the upstream face of the frame structure. At its peripheral edges, the diaphragm portion 28 joins with integral sidewall portions 29, which extend in a downstream direction to and into contact with the radial flange 24. Along its inside surface, the sidewall 29 is provided with an inwardly projecting annular rib 31 arranged to be received in a circular groove 32 formed in the frame structure sidewall 23. This arrangement provides for a measure of interlock to assure retention of the diaphragm assembly on the support structure. To advantage, the sidewall 23 of the support structure may be somewhat tapered, converging slightly in the upstream direction, to facilitate installation of the diaphragm assembly over the support structure.

In accordance with the invention, the diaphragm assembly is provided with a peripheral sealing flap 33, which joins at its base 34 with the downstream extremity 35 of the diaphragm sidewall 29. The peripheral sealing flap is attached in a cantilever fashion. That is, it is secured only at its downstream extremity 34, and the body of the flap projects in an upstream direction substantially to the full height of the frame structure 22.

Figure 3:
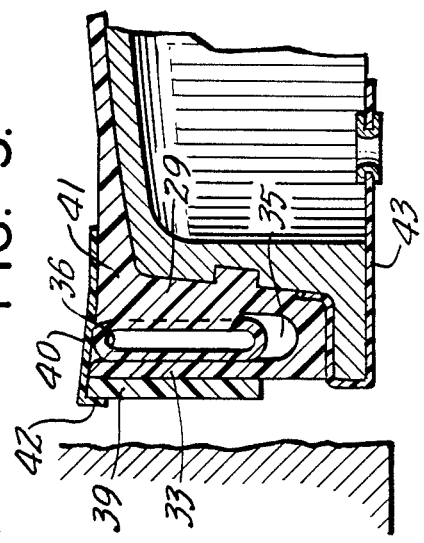
FIG. 3 is a fragmentary, cross sectional view of the structure of FIG. 2, illustrating the improved sealing arrangement, prior to pressurization of the peripheral inflatable element.

In the normal (i.e., as-molded) configuration of the sealing flap 33, it is of generally straight, cylindrical form, as shown in FIG. 3. It is spaced outward a short distance from the diaphragm sidewall 29, providing a free space 35 between the sealing flap and sidewall. As shown particularly in FIG. 3, the at-rest diameter of the sealing flap 33 is desirably approximately the same as the radial flange 24.

Located between the diaphragm sidewall 29 and peripheral sealing flap 33 is a pneumatically inflatable element 36, which extends around the full circumference of the structure and, in its depressurized condition, illustrated in FIG. 3, substantially occupies the space 35 between the sidewall and the sealing flap The pneumatically inflatable element 36 is appropriately secured in position within the space 35, most advantageously by being integrally bonded with the sidewall 29. It is significant, however, that the inflatable element be free of at least one of the sidewall or sealing flap members, and most advantageously it is kept free of the sealing flap 33, so as to allow separation of the flap 33 under certain circumstances to be described.

In the operation of the apparatus of the invention, the assembled nozzle dam unit, with the inflatable element in its depressurized condition, is inserted into the mouth of the nozzle 15. A mechanical bracket 37 is provided to attach the device mechanically to the wall of the vessel. This is conventional and forms no part of the invention, but serves to locate the frame structure in a fixed position within the nozzle passage, and to support the full water load of a full refueling pool 13.

After positioning and mounting the frame structure, fluid under pressure, in most cases but not necessarily air, is introduced into the interior of the inflatable element 36, causing the element to expand radially. As reflected in FIG. 2, this displaces the sealing flap 33 radially outward, and brings it into pressure contact with the walls of the nozzle passageway.

In a typical installation, the walls 38 of the nozzle 15 may be provided with a weld-clad surfacing, for protection against the environmental conditions. In such a case, the surface 38 is quite rough and uneven. To this end, the outer surface of the sealing flap 33 may be provided with a soft sealing pad 39 of, for example, closed cell foam construction. The pad 39 easily deforms, and conforms itself intimately with the relatively rough wall surface 38 of the passageway, when the sealing flap 33 is pressed in a radially outward direction by the inflatable element 36.

For safety reasons, it has been conventional in prior art nozzle dam devices, to utilize adjacent, redundant pneumatic elements, for effecting sealing contact with the passage walls. In such cases, the inflatable elements press directly on the walls of the passage to form the sealing closure. By providing for redundancy, it is hoped that, if one of the seals becomes accidentally depressurized, the other will hold its pressure and retain the integrity of the dam. While this appears sound in theory, it is less sound in practice, because, for example, one of the redundant seals may be or become faulty, without anyone's awareness of that fact. Thereafter, if the second seal develops a defect, there is an immediate failure and a serious problem.

Figure 4:
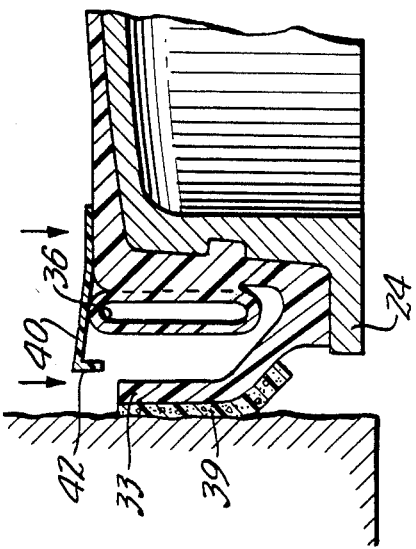
FIG. 4 is a fragmentary, cross sectional view, similar to FIG. 3, but illustrating the sealing arrangement after installation and loading, and with the peripheral inflatable element in a deflated condition, illustrating the continued effectiveness of the sealing arrangement.

Pursuant to the invention, the sealing flap 33 becomes self-holding in sealing position, once brought to that position by pressurization of the inflatable sealing element 36. Accordingly, if for some reason the inflatable element 36 becomes depressurized and deflated, as shown in FIG. 4, the pressure of the contained fluid, acting upon the upstream side of the sealing flap 33, urges the sealing flap tightly against the passage wall 38 and retains the integrity of the seal.

To expedite installation of the apparatus of the invention, it is advantageous to provide a flanged annular guard ring 40 over the upstream extremities of the sealing flap 33 and inflatable element 36. The ring 40, which may be formed of a relatively stiff elastomeric material, is bonded to the outer margins 41 of the central diaphragm portion 28. The guard ring extends over the upstream edges of the inflatable element 36, sealing flap 33 and pad 39, and is provided with a peripheral flange 42 which extends a short distance in a downstream direction, sufficient to "capture" the upstream extremities of the sealing flap and pad. The guard ring 40 serves to cover and protect the sealing portions of the device, in the manner shown in FIG. 3, during the initial assembly operations. This helps to avoid snagging of the loose end of the sealing flap, for example, which might damage the flap and/or interrupt the installation procedure.

The guard ring 40 is self-releasing, when inflation pressure is introduced into the pneumatically inflatable element 36, so that the sealing element 33 and pad 39 just pop out from under the flange 42, as the element 36 begins to inflate.

Once the nozzle dam is installed within the nozzle passage, the main body of the sealing diaphragm unit 27 is substantially concealed and may be difficult to observe from a position downstream of the dam. Accordingly, it is desirable to provide, at two or more locations around the periphery of the diaphragm assembly indication tabs 43, which are secured to the downstream edges of the sidewalls 29. The indication tabs extend past the supporting structure 22 and are readily visible to a workman located downstream thereof. This provides a convenient means of observation that the entire diaphragm unit 27 is properly positioned on its supporting structure.

The arrangement of the invention provides a significant improvement over prior art structures by, among other things, avoiding the need for redundancy of pneumatic sealing elements and, moreover, providing improved safety and performance over units utilizing redundant pneumatic elements. The use of redundant pneumatic elements requires the metallic support structure to be somewhat larger and therefore somewhat more difficult to manipulate. The arrangement of the invention also provides for a higher degree of safety in operation inasmuch as the second level of protection provided by the sealing flap 33 is much more reliable than a redundant pneumatic element. Were a redundant pneumatic element to become faulty and leak, after deflation of the first element, the entire seal would fail, perhaps with severe consequences. With the new arrangement, on the other hand, should the sealing flap 33 become defective and leak, there would be a leakage in the seal, but not a complete failure thereof as would necessarily follow from deflation of the second of two redundant pneumatic elements.

The arrangement of the present invention, while having significant advantages, is of simplified and economical construction, and it is economically competitive with the inferior prior art design.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a nozzle dam assembly of the type adapted especially for use in a steam generator nozzle for a nuclear reactor and of the type comprising a frame structure of the general shape of the passage to be sealed, a sealing diaphragm supported by said frame structure, and an inflatable peripheral sealing member adapted upon inflation to effect sealing engagement with the side walls of the passage, the improvement characterized by
   (a) said sealing diaphragm comprising a first portion supported by said frame structure and having a peripheral edge portion,
   (b) a side wall portion of said sealing diaphragm integrally joined to the peripheral edges of said first portion and extending generally in a downstream direction therefrom in surrounding relation to said frame structure,
   (c) said sealing diaphragm being provided with an integral, peripheral sealing flap,
   (d) said peripheral sealing flap being joined integrally with the downstream edge portions of said side wall portion and extending therefrom generally in an upstream direction and being supported adjacent its attached edge by said frame structure,
   (e) the free edge of said sealing flap extending in an upstream direction with respect to the pressure to be contained within said passage,
   (f) said inflatable peripheral sealing member comprising an inflatable element supported on said sealing diaphragm and adapted when pressurized to bear radially outward against said peripheral sealing flap,
   (g) said inflatable element being positioned radially between said side wall and said sealing flap,
   (h) said inflatable element being detachably associated with one of said sealing flap and sealing diaphragm whereby, upon depressurization of said inflatable element, said element is free to contract while said sealing flap is retained in sealing contact with the walls of said passage by reason of contained pressure on the upstream side of said nozzle dam.

2. A sealing dam assembly for temporary blockage of a fluid passage, which comprises
   (a) a frame structure arranged to form a rigid support having a configuration generally corresponding to the internal configuration of said passage,
   (b) said frame structure comprising a central portion disposed generally transversely to said passage and having upstream and downstream faces,
   (c) said frame structure further having a rigid side wall surrounding said central portion and extending generally in a downstream direction therefrom,
   (d) a flexible, elastomeric sealing diaphragm having a central portion supported by and covering the central portion of said frame structure and an integral side wall portion surrounding and supported by the rigid frame side wall,
   (e) said sealing diaphragm further having an integral, flexible sealing flap joined to the integral side wall portion of said diaphragm and extending about the entire periphery of said side wall portion,
   (f) said sealing flap having free edge portion projecting generally in an upstream direction in said passage and normally spaced slightly from the walls of said passage,
   (g) an inflatable element extending about the periphery of said dam assembly, between the side wall and sealing flap of said sealing diaphragm and operative upon pressurization to urge said sealing flap into sealing contact with the walls of said passage for isolation of the upstream and downstream sides of said dam against the flow of fluid,
   (h) said inflatable element being free of attachment to at least one of said side wall or sealing flap whereby, upon depressurization of said inflatable element, said sealing flap is free to be retained in sealing contact with said passage walls by reason of pressure differentials in said passage.

3. A sealing dam assembly according to claim 2, further characterized by
   (a) said inflatable element being integrally joined with said diaphragm side wall and being expandable and contractible toward and away from said sealing flap.

4. A sealing dam assembly according to claim 2, further characterized by
   (a) said sealing flap having mounted on its outer peripheral surface a soft, sponge-like layer providing a high degree of conformance to substantial wall irregularities within said passage.

5. A sealing dam assembly according to claim 2, further characterized by
   (a) said integral side wall and said sealing flap, together, being of generally U-shaped cross sectional configuration,
   (b) the central portion of said sealing diaphragm having mounted thereon an annular guard element projecting radially outward beyond said integral side wall and overlying the free end edge of said sealing flap on the upstream side thereof, (c) said annular guard element having a peripheral flange projecting in the downstream direction and engaging and confining the free end extremities of the sealing flap, (d) said sealing flap being self-releasing from the confinement of said annular guard element upon pressurization of said pneumatically inflatable element.

6. In a nozzle dam assembly of the type adapted especially for use in a steam generator nozzle for a nuclear reactor and of the type comprising a frame structure of the general shape of the passage to be sealed, a sealing diaphragm supported by said frame structure, and an inflatable peripheral sealing member adapted upon inflation to effect sealing engagement with the side walls of the passage, the improvement characterized by (a) said sealing diaphragm being provided with an integral, peripheral sealing flap, (b) said sealing flap having a free edge and an attached edge and being supported adjacent its attached edge by said frame structure, (c) the free edge of said sealing flap extending in an upstream direction with respect to the pressure to be contained within said passage, (d) said inflatable peripheral sealing member comprising an inflatable element supported on said sealing diaphragm and adapted when pressurized to bear radially outward against said peripheral sealing flap, (e) said sealing diaphragm comprising a central portion extending over the upstream face of said frame structure, (f) a side wall portion of said sealing diaphragm integrally joined to the peripheral edges of said central portion and extending generally in a downstream direction therefrom in surrounding relation to said frame structure, (g) said peripheral sealing flap being joined integrally with the downstream edge portions of said side wall portion and extending therefrom generally in an upstream direction, and (h) said inflatable element being positioned radially between said side wall and said sealing flap.

(i) said inflatable element being detachably associated with one of said sealing flap and sealing diaphragm whereby, upon depressurization of said inflatable element, said element is free to contract while said sealing flap is retained in sealing contact with the walls of said passage by reason of contained pressure on the upstream side of said nozzle dam.

7. A nozzle dam assembly according to claim 6, further characterized by (a) said inflatable element being integrally joined with said side wall portion and extendable, upon pressurization, toward said sealing flap.

* * * * *